(12) United States Patent
Abe et al.

(10) Patent No.: US 11,061,869 B2
(45) Date of Patent: *Jul. 13, 2021

(54) REDUCTION IN TIME REQUIRED TO WRITE FILE TO TAPE

(71) Applicant: International Business Machines Corporation, Armonk, NY (US)

(72) Inventors: Atsushi Abe, Ebina (JP); Takeshi Ishimoto, Kawasaki (JP); Yutaka Oishi, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 102 days.

This patent is subject to a terminal disclaimer.

(21) Appl. No.: 16/372,714

(22) Filed: Apr. 2, 2019

(65) Prior Publication Data

US 2019/0227992 A1 Jul. 25, 2019

Related U.S. Application Data

(63) Continuation of application No. 15/492,240, filed on Apr. 20, 2017, now Pat. No. 10,331,628, which is a
(Continued)

(30) Foreign Application Priority Data

Apr. 15, 2014 (JP) ................................ 2014-083749

(51) Int. Cl.
*G06F 16/17* (2019.01)
*G06F 16/178* (2019.01)
(Continued)

(52) U.S. Cl.
CPC ............ *G06F 16/178* (2019.01); *G06F 3/065* (2013.01); *G06F 3/0608* (2013.01);
(Continued)

(58) Field of Classification Search
CPC . G06F 3/0608; G06F 3/0682; G06F 17/30073
See application file for complete search history.

(56) References Cited

U.S. PATENT DOCUMENTS 8,832,365 B1 * 9/2014 Sims ..................... G06F 3/0629
711/111
8,954,663 B1 * 2/2015 Klein .................... G06F 3/0686
711/111
(Continued)

FOREIGN PATENT DOCUMENTS

JP 05303471 A 11/1993
JP 05307443 A 11/1993
(Continued)

OTHER PUBLICATIONS

IBM, "Linear Tape File System (LTFS) Format Specification", LTFS Format Version 2.0.1, Aug. 17, 2011, 71 pages.*
(Continued)

*Primary Examiner* — Loc Tran
(74) *Attorney, Agent, or Firm* — James L. Olsen (57) ABSTRACT

Reducing time required to write a file to tape is provided. Synchronous processing is performed in a file system implementing a Linear Tape File System (LTFS) file format, wherein the synchronous processing includes writing, to a tape medium of a tape cartridge, index information and one or more files. A type of the synchronous processing is determined, wherein the type is either an index-MAM sync type or an index-only sync type. Updated information is stored to a media auxiliary memory of the tape cartridge in response to determining that the synchronous processing is of the index-MAM sync type.

9 Claims, 5 Drawing Sheets

LTFS FORMAT

Related U.S. Application Data continuation of application No. 14/681,160, filed on Apr. 8, 2015, now Pat. No. 9,690,486.

(51) Int. Cl.
*G06F 3/06* (2006.01)
*G06F 16/13* (2019.01)
*G06F 16/11* (2019.01)

(52) U.S. Cl.
CPC .......... *G06F 3/0611* (2013.01); *G06F 3/0659* (2013.01); *G06F 3/0682* (2013.01); *G06F 16/113* (2019.01); *G06F 16/13* (2019.01)

(56) References Cited

U.S. PATENT DOCUMENTS

| | | | |
|---|---|---|---|
| 9,690,486 B2 | 6/2017 | Abe et al. | |
| 2013/0067158 A1* | 3/2013 | Hirata | G06F 3/0619 711/111 |
| 2015/0293935 A1 | 10/2015 | Abe et al. | |
| 2017/0220597 A1 | 8/2017 | Abe et al. | |

FOREIGN PATENT DOCUMENTS

| | | | |
|---|---|---|---|
| JP | 07248886 | A | 9/1995 |
| JP | 09017152 | A | 1/1997 |
| JP | 2003248558 | A | 9/2003 |
| JP | 2005310121 | A | 11/2005 |
| JP | 2008197745 | A | 8/2008 |
| JP | 2008293218 | A | 12/2008 |
| JP | 2009289349 | A | 12/2009 |
| JP | 2010152603 | A2 | 7/2010 |
| WO | 2012176539 | A1 | 12/2012 |
| WO | 2013054597 | A1 | 4/2013 |

OTHER PUBLICATIONS

IBM, "Linear Tape File System (LTFS) Format Specification", Aug. 17, 2011, 71 pages.*

Abe et al., "Reduction in Time Required to Write File to Tape Medium", Japanese application No. 2014-083749, pp. 1-38, filed Apr. 15, 2014.

"IBM Spectrum Archive—Linear Tape File System", provided by the inventor on Feb. 19, 2015, pp. 1-2, <http://www-03.ibm.com/systems/storage/tape/ltfs/index.html>.

"Linear Tape File System (LTFS) Format Specification", LTFS Format Version 1:0, Apr. 12, 2010, pp. 1-61, <http://www-01.ibm.com/support/docview.wss?uid=ssg1S7003166>.

"Linear Tape File System (LTFS) Format Specification", LTFS Format Version 2:0:1, Aug. 17, 2011, pp. 1-71, <http://www-01.ibm.com/support/docview.wss?uid=ssg1S7003166>.

"LTO-5", provided by the inventor on Feb. 19, 2015, Machine translation of non-English document provided, pp. 1-11, <https://web.archive.org/web/20120928234832/http://www-06.ibm.com/industries/jp/dotcom/direct/storage/100601.shtml>.

"SCSI Reference", IBM® TotalStorage® LTO Ultrium Tape Drive, Apr. 14, 2011, pp. a-430, <http://www-01.ibm.com/support/docview.wss?uid=ssg1S7003555&aid=1>.

"Virtual extended attributes", provided by inventor on Dec. 27, 2012, pp. 1-12, <http://www-01.ibm.com/support/knowledgecenter/STQNYL/com.ibm.storage.hollywood.doc/ltfs_hints_virtual_extended_attribute.html>.

What is LTO Technology?, © 1999-2015 Hewlett-Packard, IBM and Quantum, pp. 1-4, <http://www.lto.org/technology/what-is-lto-technology/>.

IBM, List of IBM Patents or Patent Applications Treated as Related, Apr. 2, 2019, 2 pgs.

* cited by examiner

DATA ARRAY AT FM WRITING TIME
IN IMMEDIATE MODE

FIG. 4

DATA ARRAY AT FM WRITING TIME IN NON-IMMEDIATE MODE

FIG. 5

DATA ARRAY IN PRECAUTION MODE

FIG. 6

REQUIRED TIME FOR PERIODIC SYNCHRONOUS PROCESSING

| SYNC TYPE | INDEX TYPE | AVERAGE REQUIRED TIME [sec] | TOTAL REQUIRED TIME [sec] |
|---|---|---|---|
| CONVENTIONAL LTFS | | 18.9 | 623.7 |
| index-mam | high performance | 15.3 | N/A |
| index-only | precaution | 4.5 | 148.5 |
| index-only | high performance | 0.0 | 0.0 |

FIG. 7

REDUCTION IN TRANSFER RATE DUE TO PERIODIC SYNCHRONOUS PROCESSING

FIG. 8

REDUCTION IN TIME REQUIRED TO WRITE FILE TO TAPE

TECHNICAL FIELD

The present invention relates generally to a technique for reducing the time required to write a file to a tape medium and, more particularly, to dealing with periodic synchronous processing caused when a file system is used.

BACKGROUND OF THE INVENTION

The IBM Linear Tape File System (LTFS) is a file system for using a tape medium like a USB memory. The LTFS format was developed by IBM. Use of the LTFS format enables access to a file stored on a tape medium directly from a file-based application without using a dedicated application for a tape drive.

A system employing the LTFS format (an "LTFS system") records data on a tape medium, including metadata, such as a file name and information on the position of the file on the tape medium, in addition to the file body. This metadata is called "index information."

SUMMARY

According to one embodiment of the present invention, a method is provided. The method includes: performing synchronous processing in a file system implementing a Linear Tape File System (LTFS) file format, wherein the synchronous processing includes writing, to a tape medium of a tape cartridge, index information and one or more files; determining a type of the synchronous processing, wherein the type is either an index-MAM sync type or an index-only sync type; and storing updated information to a media auxiliary memory of the tape cartridge in response to determining that the synchronous processing is of the index-MAM sync type.

According to another embodiment of the present invention, a tape cartridge in which a tape medium is formatted to reduce a time required for synchronous processing performed by a file system implementing a Linear Tape File System LTFS is provided, wherein: the synchronous processing includes writing, to the tape medium, index information and one or more files, data is read from and written to the tape medium in units of data sets, the tape cartridge includes a media auxiliary memory that stores updated index information, and the synchronous processing is of the index-MAM sync type.

According to another embodiment of the present invention, a tape storage system is provided. The tape storage system comprises a tape cartridge and a tape drive, wherein the tape cartridge includes a tape medium, and wherein the tape drive reads to and writes from the tape medium by a method comprising: performing synchronous processing, wherein the synchronous processing includes writing, to the tape medium, index information and one or more files; determining a type of the synchronous processing, wherein the type is either an index-MAM sync type or an index-only sync type; and storing updated information to a media auxiliary memory of the tape cartridge in response to determining that the synchronous processing is of the index-MAM sync type.

DETAILED DESCRIPTION

Embodiments of the present invention recognize that, since the LTFS format is a new approach to using a tape drive and has a data access pattern different from conventional dedicated applications for tape drives including backup applications, various performance issues resulting from the characteristics of the tape drives have emerged, and analysis and improvement activities are continued. The LTFS system performs synchronous processing for storing index information periodically on a tape medium. Further recognized is that this synchronous processing periodically performed have a big impact on the time required to write a file.

Embodiments of the present invention provide that, in the design of a file system, various factors need to be considered. Typical factors are as follows: (1) Performance (readiness, I/O rate, processing time such as Mount/Recovery); (2) Data integrity; (3) Effectiveness of space use; and (4) Influence on shared resources (Memory, CPU) of the system.

Since the LTFS format is a file system for a tape drive, how to balance the tape operating characteristics and these factors is a major design challenge in the development of the LTFS format. Further, since the LTFS format is a file system for portable media, it is strongly desired to maintain the compatibility of tape formats as well.

Embodiments of the present invention provide a technique for measuring the influence of a synchronous operation of index information resulting from the factor (2) on the performance (1) to improve performance without any discrepancy of the compatibility or data integrity. Two types, namely a sync type and an index type, are introduced into the LTFS format to change the content of synchronous processing according to the type to enable a reduction in time required to write a file without impairing the effect of the synchronous processing.

The discussion disclosed herein focuses on the following, in turn: an outline of LTFS index information and synchronous processing; the influence of the synchronous processing on the time required to write a file; measures to reduce the writing required time; and verification of the reduction measures.

The discussion now turns to LTFS index information and synchronous processing.

Embodiments of the present invention provide a design for dealing with an increase in time required for file writing due to the occurrence of periodic synchronous processing when files are written to a tape medium using an LTFS format. Further, embodiments provide a new introduction of a sync type and an index type to change information to be synchronized according to a trigger of performing synchronous processing. Further, embodiments provide that the transfer rate for file writing using the LTFS format can be reduced to one-fourth or less without impairing the synchronization effect by changing the presence or absence of updating of the MAM and the index format according to the two types. Two kinds of sync types are provided to be used properly according to the trigger of synchronous processing. In synchronous processing triggered by removing a tape medium from a tape drive, an index-MAM sync mode for updating the MAM value is applied, while in periodic synchronous processing, an index-only sync mode for not updating the MAM value is applied. A "precaution mode" for storing index information and the following file in different data sets may be done and a high performance mode for storing information and the following file in the same data set are provided as index types in such a manner that either of them can be set according to the utilization purpose upon formatting the tape medium.

Embodiments of the present invention will now be described in detail with reference to the Figures.

Figure 1:
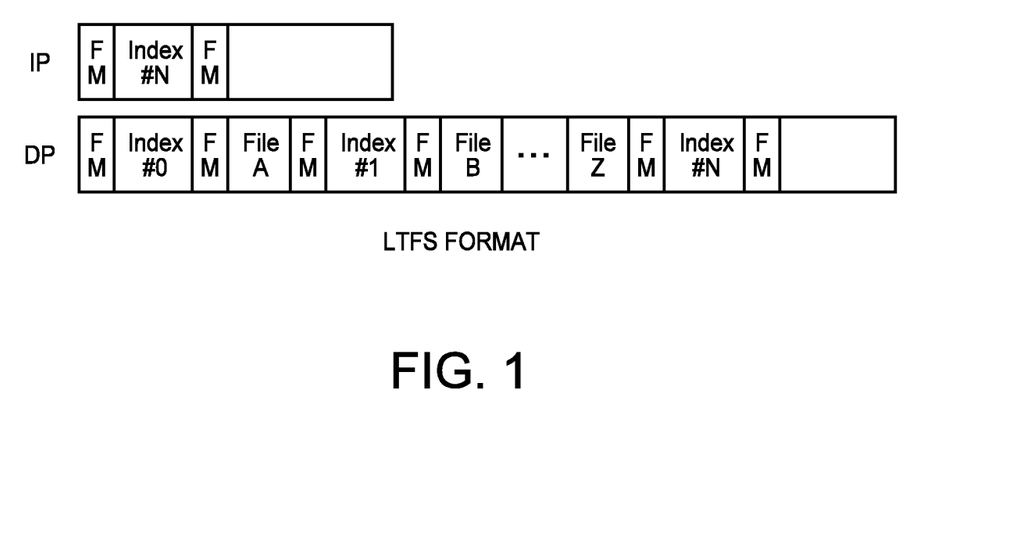
FIG. 1 is an illustrative example of an LTFS format, in accordance with an embodiment of the present invention.

FIG. 1 is an illustrative example of an LTFS format, in accordance with an embodiment of the present invention.

The LTFS format divides a tape medium into an index partition (IP) and a data partition (DP) to use the tape medium. As shown in FIG. 1, the latest index information is recorded in the IP, and file bodies and a history of index information are recorded in the DP. Upon writing index information to a tape medium, special data called a File Mark (FM) is defined in the specifications of the LTFS format to be written before and after the index information. In some embodiments, the FM is written immediately before or after (i.e., adjacent to) the index information. The FM enables easy finding of index information recorded on the tape medium. Although the information in the DP is enough in terms of the amount of information, the latest index information is recorded in the IP to reduce the time required to read index information when the tape medium is inserted into the tape drive.

Due to the nature of the tape medium, a file deletion may cause a loss of access to data written after the deleted file. For example, as depicted in FIG. 1, deleting the body of file B results in a loss of access to all data written after file B in the DP. Therefore, a file in the LTFS system is deleted by removing metadata of the file from the index information (i.e., from the IP) while leaving the file body in the DP.

Since the file body and the history of index information of a file remain in the DP following deletion of the file, it is possible to perform a "rollback" by referring to previously recorded index information of the file, thereby restoring the file.

According to the LTFS format, the index information is written on a tape medium in an extended markup language (XML) file format. This XML file has metadata, such as file names, of all files written on the tape medium. In one example, the size of the XML file having index information is about 1 KB depending on the length of the file names and the like.

When the LTFS system reads and writes index information and a file body from and to a tape medium, variable-length data called a "record" is exchanged between the LTFS system and the tape drive. Fixed-length data called "data set" is read and written between the tape drive and the tape medium. Two or more records may be stored in a data set or a record may span two or more data sets.

Figure 2A:
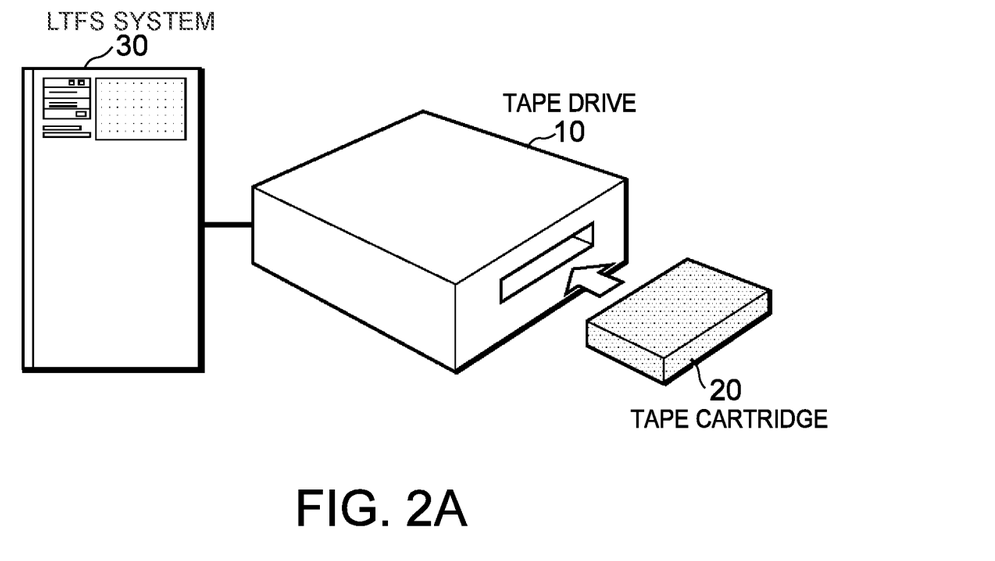
FIGS. 2A-2B are functional block diagrams depicting a configuration in accordance with an embodiment of the present invention.
Figure 2B:
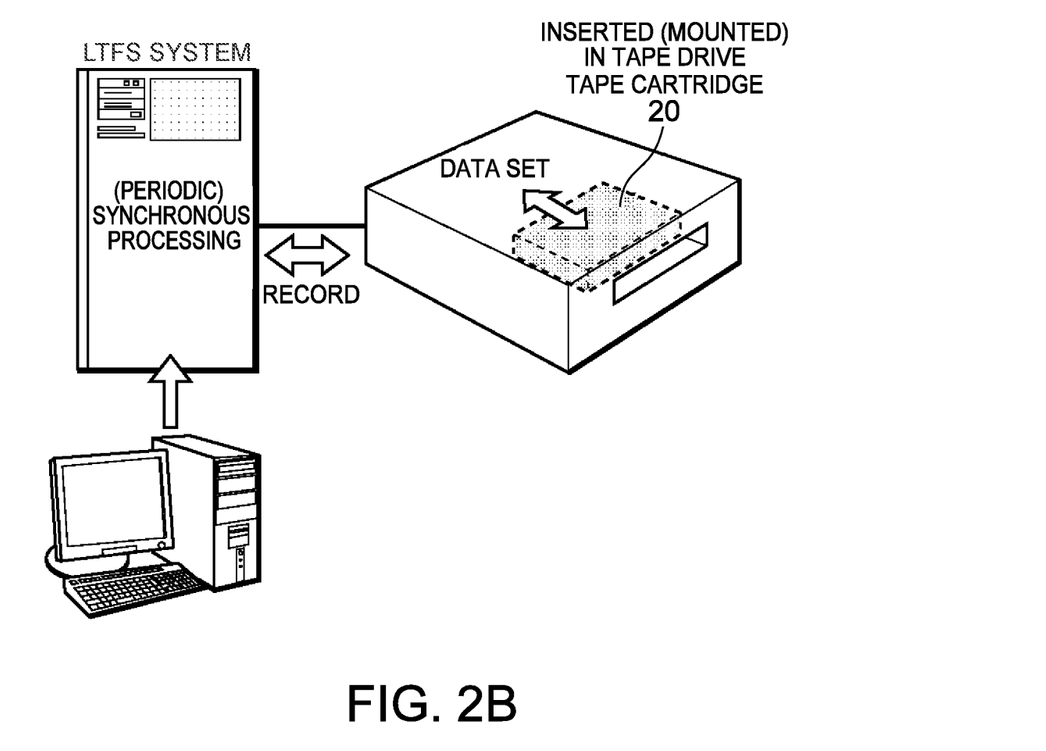

FIGS. 2A-2B are functional block diagrams depicting a tape drive environment, in accordance with an embodiment of the present invention. The tape drive environment includes: LTFS system 30, tape drive 10, and tape cartridge 20.

When the update of index information in the IP fails after the index information in the DP is updated, index information in the DP will have newer information than the index information previously written in the IP.

In order to detect this state from information written on the tape medium, it is necessary to read and compare index information between the IP and the DP each time the tape medium (e.g., tape cartridge 20) is inserted in the tape drive (e.g., tape drive 10), and this lengthens the time required to mount the tape medium in the LTFS system.

To avoid this, Volume Coherency Information (VCI) is left in a Media Auxiliary Memory (MAM) area of a Cartridge Memory (CM) that is a non-contact memory chip stored in a tape cartridge together with the tape medium as a means for checking if index information in the IP matches index information in the DP.

The VCI has information on the generation of index information recorded on the tape medium and the location of the index information on the tape medium, and the LTFS system also updates the VCI value in the MAM each time the index information is updated.

Figure 3:
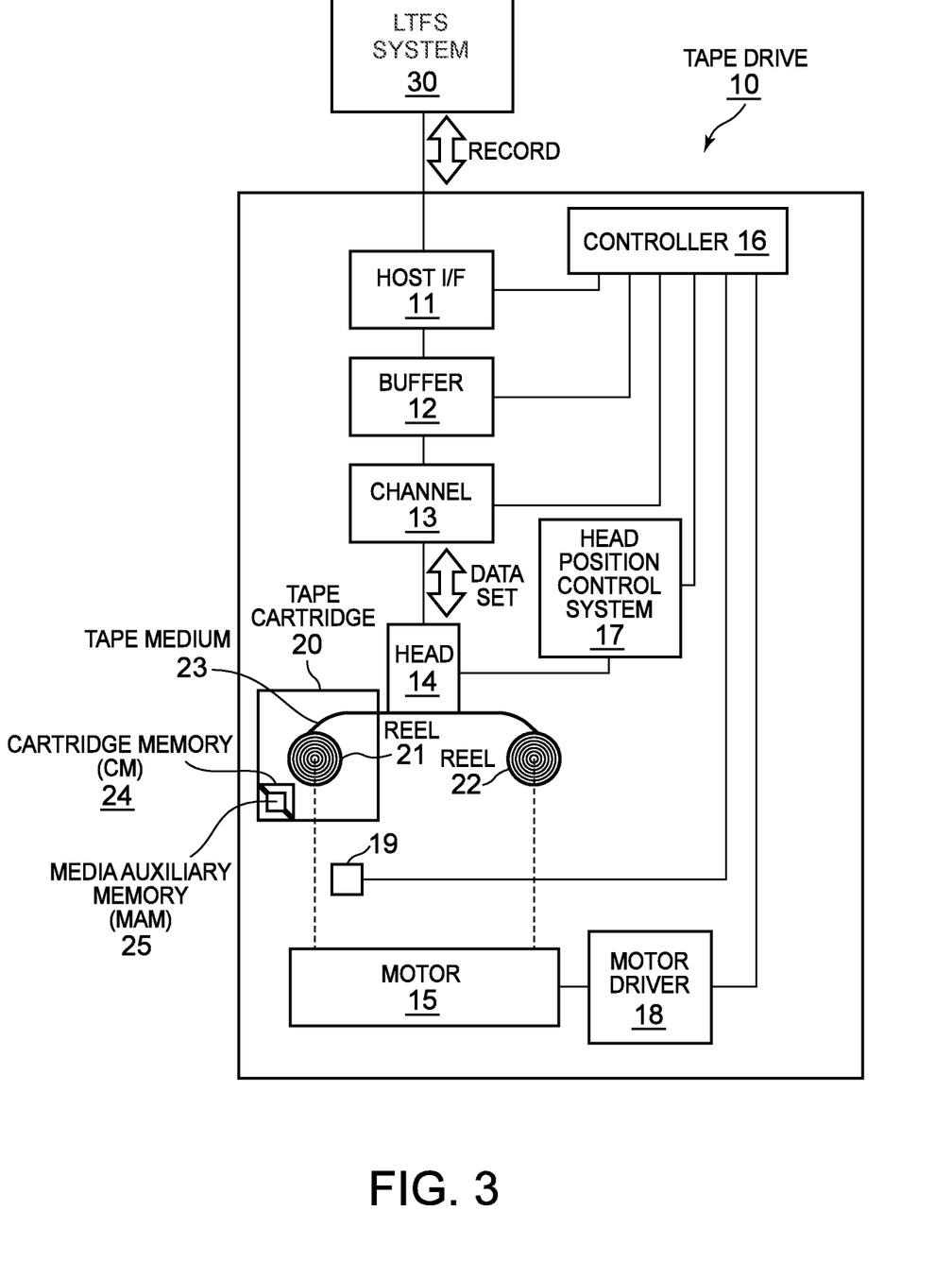
FIG. 3 is a functional block diagram depicting a configuration in accordance with an embodiment of the present invention.

FIG. 3 is a functional block diagram depicting components of tape drive 10, on which embodiments of the present invention may be implemented. Tape drive 10 includes: host I/F 11, buffer 12, channel 13, head 14, motor 15, controller 16, head position control system 17, motor driver 18, component 19, tape cartridge 20, reel 21, reel 22, tape medium 23, cartridge memory (CM) 24, and media auxiliary memory (MAM) 25. Tape drive 10 is in communication with LTFS system 30.

Processing in which the LTFS system writes index information on the tape medium is called "synchronous processing." In an example of a default setting, synchronous processing is performed every five minutes as well as when a tape medium is removed from the tape drive. Each piece of index information written on the tape medium has metadata on files written before the index information. In other words, when index information having metadata on files written on the tape medium cannot be written in a case where the tape drive is turned off by mistake after a file is written or the like, the file cannot be accessed even if the file body is written on the tape medium.

The implementation of periodic synchronous processing is useful to avoid the occurrence of a phenomenon in which the file cannot be accessed because of a lack of index information despite the fact that the file body is recorded on the tape medium. The frequency with which synchronous processing is to be performed can be extended or the periodic synchronous processing can be disabled, but doing so increases the impact in the event that index information cannot be written.

The synchronous processing can also be performed each time a file recorded on the tape medium is closed. This can limit the files to be lost when the index information cannot be written to only the opened file at most. On the other hand, when the synchronous processing is performed each time a file is closed to write index information on the tape medium, the relative size of an area occupied by index information in the DP, especially in a case where numerous files of small sizes are recorded, cannot be ignored, resulting in a reduction in effective utilization rate of the capacity.

The discussion now turns to the influence of the synchronous processing on the time required to write a file.

When the synchronous processing is performed periodically during writing of files, since the tape drive records information other than the files on the tape medium, the time required to write the files increases compared to a case where no periodic synchronous processing is performed.

The influence of synchronous processing on the writing required time is quantitatively evaluated. The following is an example of a measurement procedure for evaluating this influence, according to an embodiment of the present invention:

In this example, a fifth-generation linear tape-open (LTO) tape drive is used to write 1327 files of a file size of 1GiB with random information filled in a cartridge formatted in the LTFS format, i.e. corresponding to 1.425 TB (when data to be written cannot be scaled down even if being compressed, although the capacity of a fifth-generation tape medium is 1.5 TB, the size of the DP storing file bodies is 1.425 TB because the LTFS system uses the tape medium by dividing it into the IP and the DP), and the required time is measured to evaluate the influence of synchronous processing on the time required to write the files.

The total time required to write the files is improper as a target for measurement/comparison to examine the influence of synchronous processing. This is because the required time for recovery processing (ERP: Error Recovery Procedures) for recoverable errors that have occurred within the tape drive during writing files is included in the total time required for writing, and the total time required to write the files increases and decreases in a few minutes depending on the frequency of occurrence of ERP.

To avoid the influence of ERP, the required time for each synchronous processing periodically performed is measured to examine the influence of synchronous processing on the time required to write the files based on the average value. Continuing the above example, as a result of the analysis of dump files in the tape drive, it was confirmed that ERP occurred several times during writing files corresponding to 1.425 TB and no ERP occurred during synchronous processing in a set of measurements made as the application evaluation.

Continuing the above example, an average required time for synchronous processing when 1327 files of a file size of 1GiB are written was 18.9 seconds. Since the transfer rate when the fifth-generation LTO tape drive reads and writes data is 140 MB/sec, it can be said that the number of times of periodic synchronous processing performed every five minutes is 33, except for the influence of ERP on the required time, as determined by Equation 1:

$$\frac{\frac{1.425 TB}{140 \text{ MBps}}}{5 \text{ min}} = 33.9 \qquad \text{Equation 1}$$

Continuing the above example, the periodic synchronous processing increases, by 623.7 seconds, the total required time for writing the 1327 files of the file size of 1 GiB. If this is converted into the transfer rate, it can be said that an average transfer rate is 131.9 [MB/sec] from Equation 2, and that the average transfer rate is reduced by 8.1 [MB/sec] as a result of periodic synchronous processing. Equation 2:

$$1.425 TB / \left( \frac{1.425 TB}{140 \text{ MBps}} + 623.7 \text{ sec} \right) = 131.9 \text{ MBps} \qquad \text{Equation 2}$$

Continuing the above example, as a result of analyzing dump files output by firmware of the fifth-generation LTO tape drive to survey the details of the required time for synchronous processing periodically performed, it became clear that "repositioning" (an operation of the tape drive to rewind the tape medium) occurred many times during synchronous processing.

Continuing the above example, in the repositioning, since the tape medium traveling at a speed of 6 m per second is accelerated/decelerated with an acceleration of 10 m/sec2 to rewind the tape medium while securing a margin to stabilize the speed after the acceleration, it generally takes about three seconds. Further, since the tape drive cannot read and write data from and to the tape medium during the acceleration/deceleration, the required time for synchronous processing will become longer if repositioning occurs during synchronous processing.

There are three triggers of repositioning that occurs during synchronous processing as follows: Writing of an FM immediately before index information; Writing of the FM immediately after index information; and Updating of the MAM value. In writing the FM immediately before and after index information, the LTFS system cannot send the tape drive a record to be written next until the writing of the FM is completed. Therefore, since repositioning occurs on the grounds that data to be written next by the tape drive after the writing of the FM is not delivered to a buffer memory of the tape drive, it takes about three seconds to write the next data.

In order to update the MAM value, the LTFS system reads the MAM value from the CM, updates part of information in the MAM, and writes the MAM value to the CM. In some embodiments, this series of operations is completed rapidly (i.e., within a minimal duration of time). However, when being required to update the MAM from the LTFS system, the tape drive writes, onto the tape medium, all records waiting to be written to a tape medium and stored in the buffer memory of the tape drive, and changes the internal state of the tape drive from a write mode to an idle mode.

Therefore, in order to continue to write files again after updating the MAM value, the tape drive performs processing for changing the internal state once to a read mode to read, from the tape medium, a data set including a write start position, and then changing the internal state of the tape drive to the write mode to start writing new data in the middle of the data set. Since repositioning occurs each time reading or writing of a record from or to the tape medium is started, it takes 10 to 17 seconds to write data after the MAM value is updated.

The discussion now turns to measures to reduce the writing required time.

Figure 4:
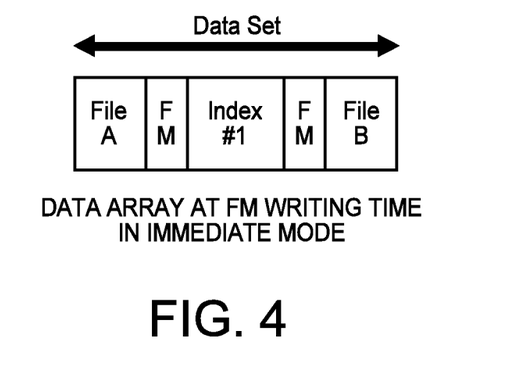
FIG. 4 is a diagram of a data array at the time of file mark (FM) writing in an immediate mode, in accordance with an embodiment of the present invention.

FIG. 4 is a diagram of a data array at the time of file mark (FM) writing in an immediate mode, in accordance with an embodiment of the present invention.

Embodiments of the present invention recognize that, if the occurrence of repositioning resulting from writing of the FM and updating of the MAM can be avoided, the influence of synchronous processing on the required time for file writing can be reduced.

Embodiments of the present invention provide improvement measures for writing transfer rate to reduce the required time for file writing, namely the introduction of a sync type and an index type.

The purpose of updating the MAM value upon synchronous processing is to enable the LTFS system to determine whether it is necessary to read index information from the DP by referring to the MAM value when the tape medium is inserted into the tape drive in order to compare the index information with index information in the IP.

Therefore, in one embodiment, the MAM value is updated in synchronous processing that is performed when the tape medium is removed from the tape drive. On the other hand, the MAM value does not always need to be updated in synchronous processing periodically performed. Therefore, two kinds of sync types are provided to be used properly according to the trigger of synchronous processing.

In the synchronous processing triggered by removing the tape medium from the tape drive, an index-MAM sync mode for updating the MAM value is applied, while in periodic synchronous processing, an index-only sync mode for not updating the MAM value is applied.

The application of the index-only sync mode lengthens a period of time during which the latest index information on the tape medium does not match index information included in the MAM.

There is no problem if the pieces of index information do not match with each other while the tape medium is inserted in the tape drive. However, if the tape medium exits from the tape drive in a case where the tape drive is turned off or the like, there is a possibility that the conventional LTFS system will misunderstand old index information held by the LTFS system to be the latest the next time the tape medium is inserted into the tape drive (remounted). To avoid this kind of situation, when the index-only sync mode is applied, it is required to update the MAM value in order to show that the index information in the MAM is invalid before a file is first written after the tape medium is inserted in the tape drive.

An "immediate mode" and a "non-immediate mode" are prepared for the time when an application writes the FM to the tape medium.

FIG. 4 is a diagram showing a data array at the time of FM writing in the immediate mode.

In the "immediate mode," the tape drive receives a record to be written next before actually writing the FM to the tape medium, and the FM and the record to be written next are stored in the same data set as shown in FIG. 4.

Figure 5:
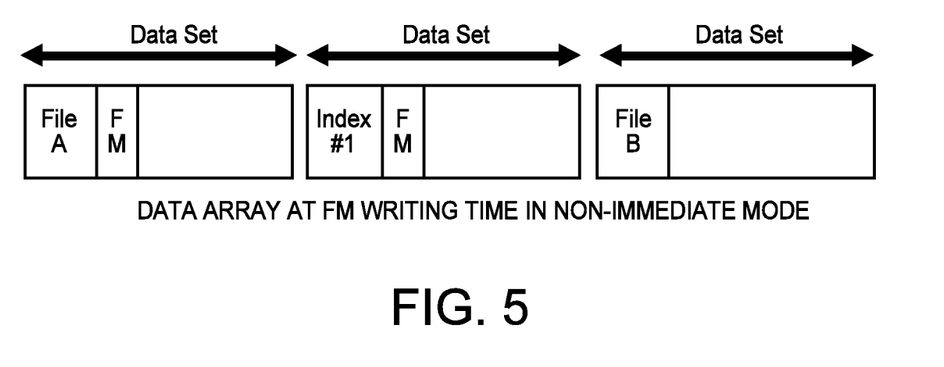
FIG. 5 is a diagram of a data array at the time of FM writing in a non-immediate mode, in accordance with an embodiment of the present invention.

FIG. 5 is a diagram of a data array at the time of FM writing in a non-immediate mode, in accordance with an embodiment of the present invention.

In the "non-immediate mode," since the tape drive does not receive the next record until the writing of the FM to the tape medium is completed, the FM and the record to be written next are written to different data sets as shown in FIG. 5, though it takes an extra time of about three seconds because repositioning occurs at the time of writing the next record.

In the LTFS system, since index information and the following file are stored in different data sets, the FM is written in the non-immediate mode. The reasons for this are illustrated by the following example. When first index information is referred to using rollback, second index information recorded after the first index information is deleted. In such an example, if index #1 and File B are stored in the same data set as shown in FIG. 4, the data set including index #1 is rewritten on the tape medium upon overwriting of the part of File B. Storing the index information and the following file in different data sets is advantageous to avoid the situation in which index #1 is also lost when the tape drive fails in writing the data set.

On the other hand, when the rollback function is not to be used, or when the same file is stored on two or more tape media in case of a disaster or the like, even if the index information and the following file are divided into different data sets, there will be no advantage, while the required time for synchronous processing increases and the recording density is reduced.

Further, in the current implementation, since index information and a file immediately before the index information are just handled in accordance with the way to write the FM after the index information, it makes no sense to divide them into different data sets.

Figure 6:
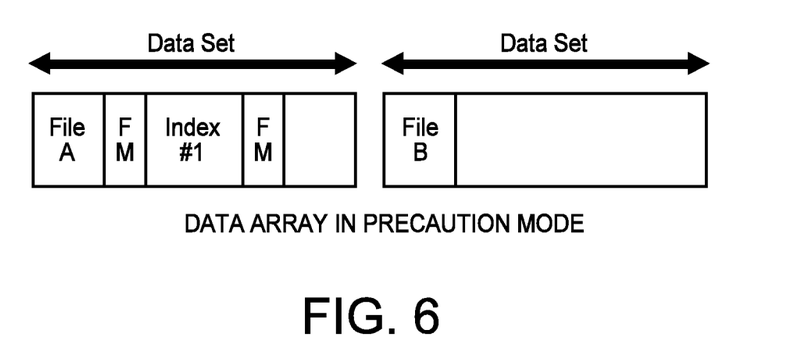
FIG. 6 is a diagram of a data array in a precaution mode, in accordance with an embodiment of the present invention.

Therefore, a "precaution mode" (FIG. 6) for storing index information and the following file in different data sets may be done. A high performance mode (FIG. 4) for storing index information and the following file in the same data set are provided as index types in such a manner that either of them can be set according to the utilization purpose upon formatting the tape medium in the LTFS format. FIG. 6 is a diagram of a data array in a precaution mode, in accordance with an embodiment of the present invention.

The discussion now turns to verification of the reduction measures.

Figure 7:
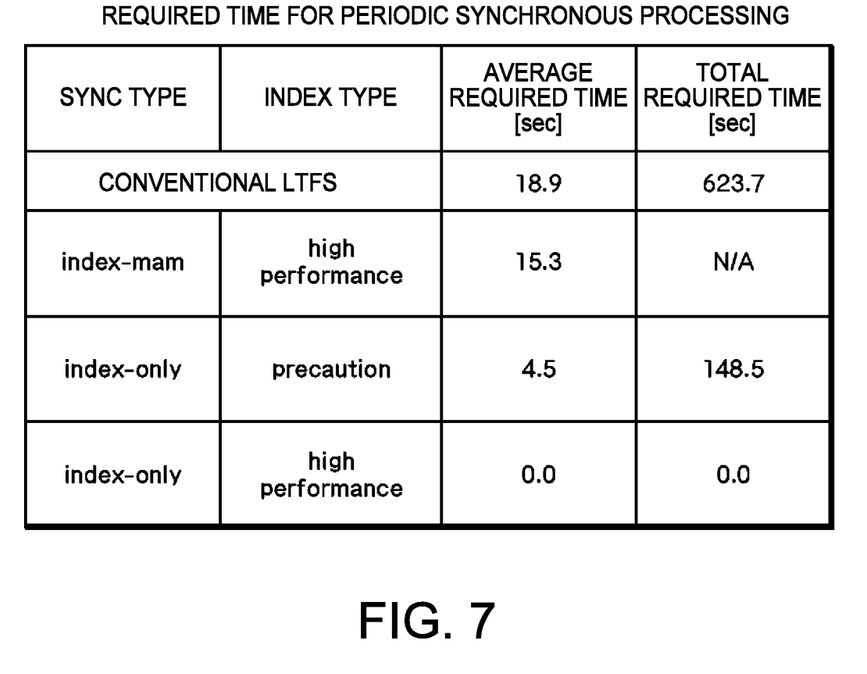
FIG. 7 is a chart showing example results of measuring the influence of periodic synchronous processing on the writing required time in each mode, in accordance with an embodiment of the present invention.

FIG. 7 is a chart showing example results of measuring the influence of periodic synchronous processing on the writing required time in each mode, in accordance with an embodiment of the present invention.

FIG. 7 shows example results of measuring the influence of periodic synchronous processing on the writing required time in each mode utilizing the measurement procedure discussed above in connection with FIG. 3. When the sync type is the index-MAM sync mode and the index type is the high performance mode, since synchronous processing upon removing the tape medium from the tape drive is assumed and the total required time on the assumption of synchronous processing periodically performed does not make sense, N/A is used to fill the corresponding cell.

As shown in FIG. 7, when the sync type is the index-only sync mode and the index type is the precaution mode (i.e., when synchronous processing periodically performed takes over the conventional index format for writing the index information and the following file to the tape medium in a manner to be divided into different data sets), the average required time was 4.5 seconds, which is shorter by 14.4 seconds than the case of the conventional LTFS implementation.

When the sync type is the index-only sync mode and the index type is the high performance mode (i.e., when the synchronous processing periodically performed is to write index information and the following file to the same data set), the overhead of the synchronous processing was absorbed in the buffer memory of the tape drive and the phenomenon in which the time required for file writing increases was not found.

When the sync type is the index-MAM sync mode and the index type is the high performance mode (i.e., when the synchronous processing is performed upon removing the tape medium from the tape drive), the average required time is less than in the case of the conventional LTFS implementation.

Figure 8:
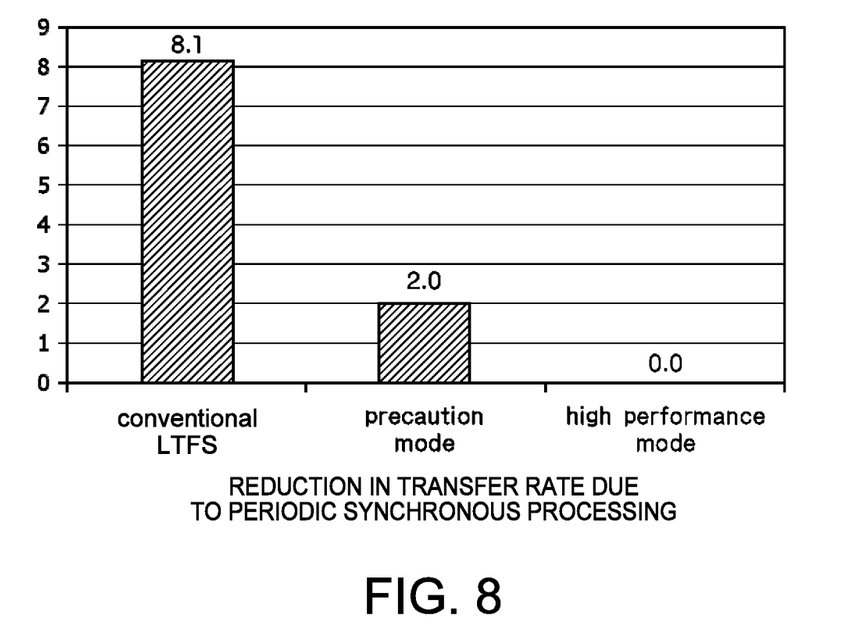
FIG. 8 is a graph showing an example reduction in transfer rate due to synchronous processing periodically performed, in accordance with an embodiment of the present invention.

Note, however, that the values depicted in FIGS. 7 and 8 are merely examples of values derived utilizing a measurement procedure such as that described above in connection with FIG. 3. The average required time and total required time may vary depending on specific test conditions and/or test procedures.

When the tape medium is removed from the tape drive, index information is recorded in the DP, and the MAM value corresponding to the DP is updated. Then, the procedure shifts to the IP to record index information in the IP and update the MAM value corresponding to the IP. After that, the tape medium is rewound and removed without writing new data to the tape medium.

Therefore, it is expected that the internal state of the tape drive enters the idle mode when updating the MAM value upon removing the tape medium, and this is not a bottleneck of the required time for synchronous processing.

When the results of FIG. 7 in the case of using the index-only sync mode are applied to Equation 2, the transfer rate for file writing when synchronous processing is periodically performed is 138.0 MB/sec in the precaution mode and 140.0 MB/sec in the high performance mode.

FIG. 8 is a graph showing an example reduction in transfer rate due to synchronous processing periodically performed, in accordance with an embodiment of the present invention.

In the precaution mode in which the format of index information is not substantially changed from the conventional one, the reduction in transfer rate becomes one-fourth or less compared to the conventional LTFS implementation.

The required time for synchronous processing periodically performed also depends on the amount of index information. It is found that the amount of index information for one million files is generally about 1 GB though this is not necessarily appropriate because the amount of index information also varies according to the length of file names.

As the number of files increases and hence the amount of index information increases, the required time for synchronous processing periodically performed also increases. However, the reduction in time required for synchronous processing by the application of the sync type and the application of the index type is achieved by reducing the processing time for processing independent of the amount of index information, and it is considered to have the effect of reducing the time required to write files to the same degree even when the amount of index information increases.

What is claimed is:

1. A method of writing data in a file system including a Media Auxiliary Memory (MAM), the method comprising:
    performing, in response to a trigger, synchronous processing in the file system, wherein the synchronous processing includes writing, to a tape medium of a tape cartridge, one or more files, and updating index information on the tape medium;
    performing one of two types of synchronous processing, wherein the type is either an index-Media Auxiliary Memory (index-MAM) sync type or an index-only sync type, wherein the type of synchronous processing is based on the trigger;
    performing, in response to the tape cartridge being mounted in a tape drive, synchronous processing of the index-MAM sync type, wherein performing synchronous processing of the index-MAM sync type includes storing updated information to the MAM of the tape cartridge;
    performing, in response to synchronous processing being periodically performed by the file system, synchronous processing of the index-only sync type, wherein performing synchronous processing of the index-only sync type includes not storing updated information to the MAM of the tape cartridge; and
    performing, in response to the tape cartridge being removed from the tape drive, synchronous processing of the index-MAM sync type.

2. The method of claim 1, wherein the index-only sync type is triggered in response to the synchronous processing being periodically performed by the file system.

3. The method of claim 2, wherein the type of synchronous processing switches from the index-only sync type to the index-MAM sync type based on an occurrence of either of: the tape cartridge being mounted in the tape drive or the tape cartridge being removed from the tape drive.

4. The method of claim 1, wherein the updated information includes information on a generation of index information recorded on the tape medium and a location of the index information on the tape medium.

5. The method of claim 1, wherein the index-MAM sync type is triggered based on an occurrence of either of: the tape cartridge being mounted in the tape drive or the tape cartridge being removed from the tape drive.

6. The method of claim 5, wherein the type of synchronous processing switches from index-MAM sync type to the index-only sync type in response to the synchronous processing being periodically performed by the file system.

7. The method of claim 5, further comprising:
    updating the media auxiliary memory after the tape cartridge is remounted in the tape drive and before one or more files are initially written to add an indication that index information stored in the media auxiliary memory of the tape cartridge is invalid.

8. The method of claim 1, wherein the synchronous processing further includes:
    comparing index information stored in the media auxiliary memory to index information stored in a data partition of the tape medium in the tape cartridge;
    writing one or more files to the data partition; and
    storing index information to an index partition of the tape medium, wherein the index partition is located separately from the data partition.

9. A tape cartridge in which a tape medium is formatted to reduce a time required for synchronous processing performed by a file system comprising:
    a media auxiliary memory (MAM) that stores updated index information, wherein the synchronous processing includes writing, to the tape medium, one or more files, and updating index information to the tape medium, wherein the synchronous processing is either an index-MAM sync type or an index-only sync type, wherein updated information is stored to the MAM in response to the index-MAM sync type, and wherein the MAM is not updated in response to the index-only sync type,
    wherein the index-MAM sync type is triggered based on an occurrence of either of: the tape cartridge being mounted in a tape drive or the tape cartridge being removed from the tape drive, and
    wherein the index-only sync type is triggered in response to the synchronous processing being periodically performed by the file system.

* * * * *